Patented Apr. 14, 1942

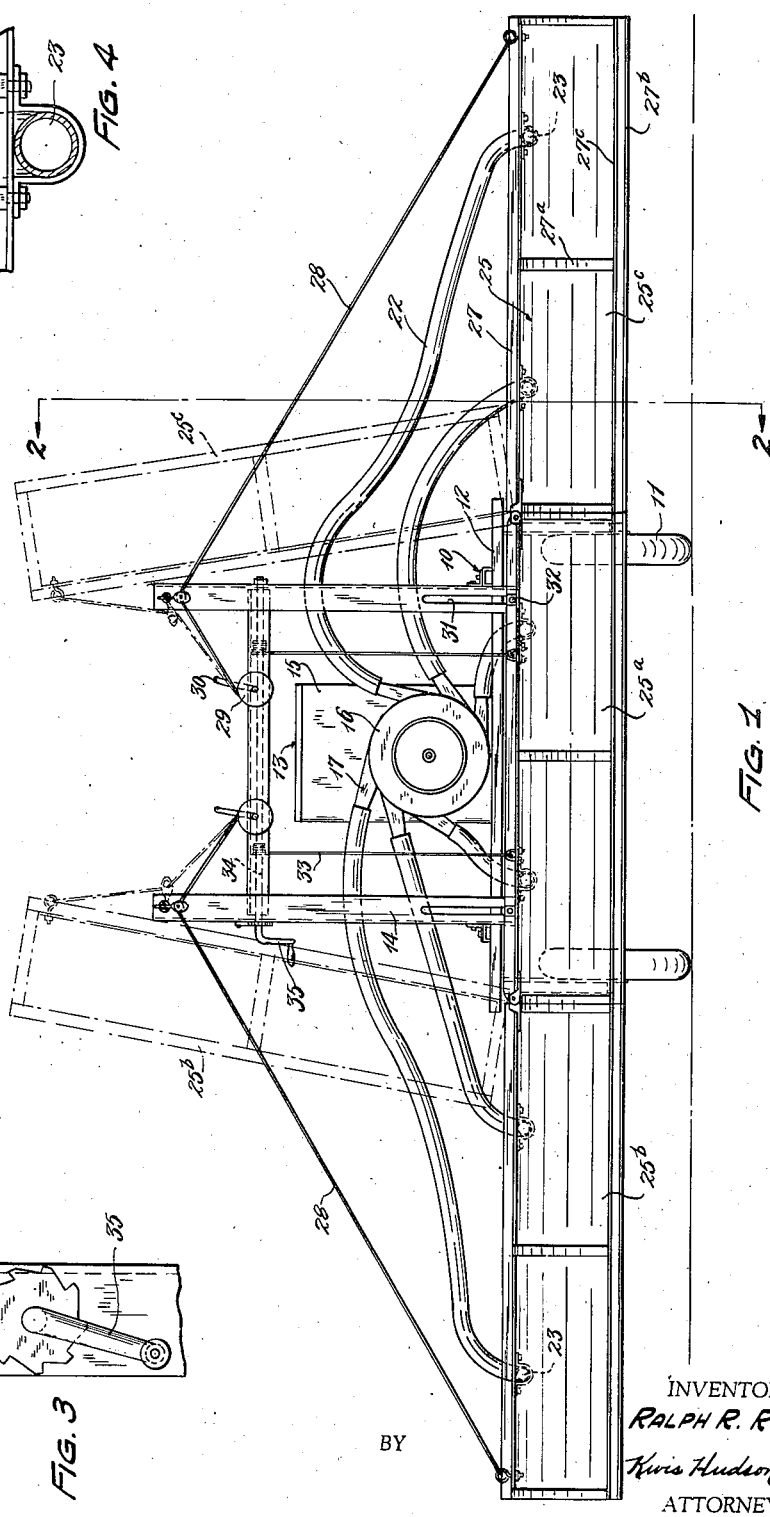
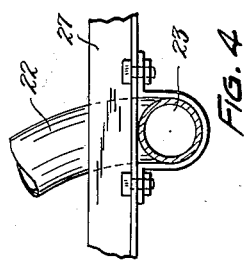
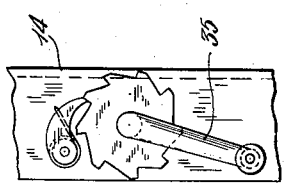

2,279,495

UNITED STATES PATENT OFFICE 2,279,495

DUSTING APPARATUS

Ralph R. Root, Lakewood, Ohio, assignor to The Root Manufacturing Company, Cleveland, Ohio, a corporation of Ohio Application July 25, 1940, Serial No. 347,452

2 Claims. (Cl. 43—148)

This invention relates to apparatus for distributing insecticide and fungicide materials in dust or powder form, and as one of its objects aims to provide improved apparatus with which materials of this kind can be more efficiently and satisfactorily applied to ground crops than has heretofore been possible.

Another object of my invention is to provide improved dusting apparatus of the portable type having novel distributing means by which insecticide and fungicide materials can be efficiently applied to ground crops with minimum interference from natural winds.

A further object of my invention is to provide improved dusting apparatus of the character mentioned, having means for discharging a plurality of streams of dust-laden air and novel deflecting means arranged to receive said streams against a concave face thereof for directing the dust-laden air.

Still another object of my invention is to provide improved portable dusting apparatus having a plurality of laterally spaced outlets for discharging streams of dust-laden air and a laterally elongated transversely curved deflecting member arranged relative to said outlets to receive the air streams against its concave face and transversely to its longitudinal axis whereby the dust-laden air streams are directed toward the ground substantially without interference from natural winds and produces dust clouds which roll and boil among the foliage of the ground crops being dusted.

My invention may be further briefly summarized as consisting in certain novel combinations and arrangements of parts hereinafter described and particularly set out in the appended claims.

In the accompanying sheets of drawings,

Fig. 1 is a rear elevation showing portable dusting apparatus embodying my invention;

Fig. 3 is a fragmentary view showing an adjusting crank and its locking means; and Fig. 4 is another fragmentary view showing the connection of the dust delivery conduits with the deflector.

Figure 2:
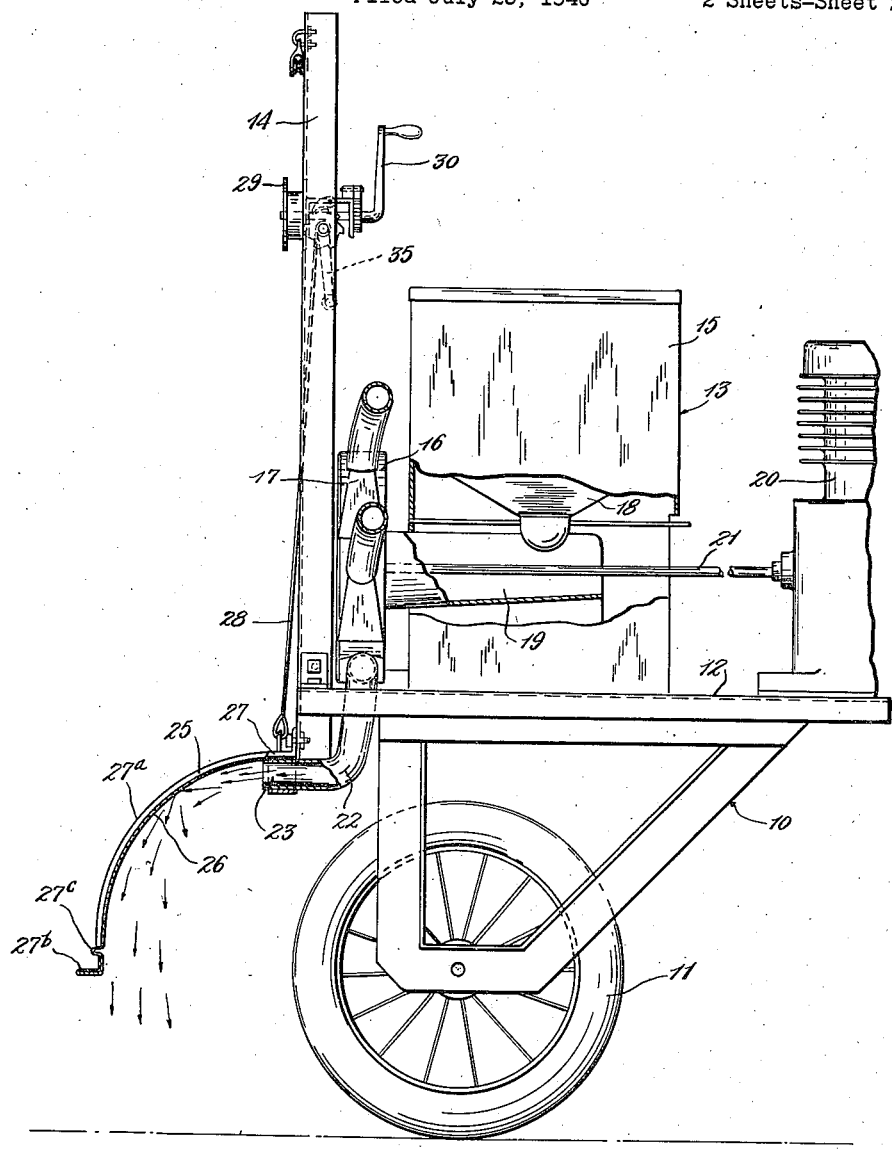
Fig. 2 is a sectional elevation of the apparatus taken as indicated by line 2—2 of Fig. 1.

More detailed reference will now be made to the drawings for the purpose of describing the construction and operation of the illustrated embodiment of my improved dusting apparatus. It will be understood, of course, that the invention is not limited to the particular embodiment shown and described, but is applicable to various other specific forms of apparatus of this character.

The dusting apparatus shown in this instance is of the portable or traveling type embodying a carriage or vehicle 10 adapted to be moved over the ground and providing a support for the various parts of the apparatus. As here shown, the carriage 10 may have supporting wheels 11 and a platform or frame 12 on which a device 13 for creating the dust-laden streams of air may be mounted. The carriage may also have an upright frame portion 14 to which further reference will be made hereinafter.

The streams of dust-laden air may be generated by any efficient form of apparatus suitable for this purpose, such as the device 13 shown in this instance, which I have found to be capable of delivering such dust-laden air streams at a relatively high velocity. This dust delivering means may comprise a tank or reservoir 15 adapted to contain a supply of the dust, and a blower 16 having a plurality of nozzles 17 and operable to deliver streams of dust-laden air through such nozzles. The tank 15 may have a hopper bottom 18 for feeding the dust into an intake passage 19 through which air is drawn into the casing of the blower 16. The blower may be driven by a suitable power device, such as the internal combustion engine 20 which is connected therewith by the shaft 21. Conduits 22 in the form of flexible hose or tubing are connected with the nozzles 17 of the blower casing for conducting the dust-laden streams of air to the desired delivery points or discharge outlets. In this instance the outer ends of the conduits 22 are arranged to provide a laterally extending row of spaced discharge outlets or delivery nozzles 23 which deliver their dust streams in a rearward substantially horizontal direction.

An important feature of my invention is a novel deflector 25 which renders my dusting apparatus especially suitable for efficiently dusting all forms of ground crops. This deflector may be in the form of a laterally elongated transversely curved member which is mounted on the carriage 10 so as to receive the dust-laden streams of air from the delivery nozzles 23 against the concave face 26 thereof. This deflector may be formed of sheet metal or like material suitably reenforced by ribs, flanges or stiffening members. In the embodiment illustrated I show the deflector reenforced along its upper edge by the angle iron 27 and stiffened transversely by the bars 27a which follow the transverse curvature. The deflector may be reenforced along its lower edge by an angular flange 27b or the like and also, if desired, by a rib 27c adjacent thereto.

I find that good results can be obtained when the deflector 25 is constructed so that the width or transverse curvature thereof is substantially equal to ninety degrees of arc although it will be understood, of course, that the length, width and curvature of the deflector can be varied considerably. As here shown, the deflector is arranged with its concave face 26 directed toward the ground and with its laterally extending upper edge connected with the carriage 10 in overlying relation to the rearwardly projecting discharge nozzles 23 and lying in a substantially horizontal plane. With respect to the nozzles 23 the deflector curves rearwardly and downwardly and in this instance the laterally elongated lower edge lies in a vertical plane which is substantially normal to the ground. With the transversely curved shape and arrangement just described for the deflector 25, it will be seen that the streams of dust-laden air delivered at high velocity by the nozzles or openings 23, will be directed against the upper portion of the concave face 26 and will be directed thereby downwardly toward the ground and against the foliage of the ground crops. It will also be seen that with this arrangement portions of the dust streams will impinge directly on the foliage of the growing crops and other portions of the streams will strike the ground and will roll and boil in the form of dust clouds causing the dust to be brought into effective contact with under portions of the foliage not ordinarily reached by dusting apparatus heretofore used.

In addition to producing the efficient dusting action just described, the deflector 25 also largely eliminates the detrimental effects of natural winds and in some instances takes advantage of such winds. Thus when the apparatus is traveling toward the right, as seen in Fig. 2, and there is a following natural wind, such wind will strike against the convex outer surface of the deflector and will have little or no effect upon the dust streams being discharged through the outlets 23. On the other hand, if the wind is a head wind, it will strike against the concave face 26 of the deflector and will be directed downwardly thereby, but since this is the same direction in which the dust-laden streams are traveling, the wind will merely augment the velocity of the dust streams. If the natural wind is a cross wind, that is to say, is blowing across the field transversely to the direction in which the dusting apparatus is traveling, it will have little or no effect upon the dust streams because they are being delivered beneath the deflector 25 and are shielded thereby.

The deflector 25 may be constructed of any desired length and for convenience in maneuvering or storing the dusting apparatus and for various other reasons, may be made in sections, as shown in Fig. 1. In the apparatus here illustrated, the deflector comprises an intermediate section 25a and end sections 25b and 25c. The end sections are preferably hinged to the intermediate section 25a so that they can be lifted or swung to the broken line positions shown in Fig. 1 and when lowered to their full line positions will form lateral extensions or continuations of the intermediate section. Suitable means may be provided for raising and lowering the end sections 25b and 25c of the deflector such as the cables 28 and the winding reels 29 mounted on the upright frame section 14 and adapted to be operated by cranks 30.

It may be desirable to vary the position or spacing of the deflector 25 with respect to the ground and for this purpose I provide suitable adjusting means which may comprise slots 31 formed in the upright frame section 14 of the carriage and bolts 32 on the deflector adjacent its upper edge which extend through the slots and are movable therealong. The deflector can be raised or lowered within the limits afforded by the slots 31 by suitable means such as the cables 33 and a winding shaft 34 mounted on the frame section 14 and adapted to be rotated by a crank 35.

The delivery outlets or discharge nozzles 23 may be provided in any suitable number depending upon the length of the deflector 25 and other factors such as the characteristics of the dust being distributed and the desired rate of dust delivery. In this instance I show six such outlets and a corresponding number of nozzles 17 on the casing of the blower 16. It will be understood, of course, that a larger or smaller number of such delivery outlets could be provided.

From the foregoing description and the accompanying drawings, it will now be readily understood that I have provided improved dusting apparatus which is especially suitable for use in dusting ground crops and that by reason of the novel deflecting means embodied in this apparatus, a more efficient and effective distribution of the dust can be obtained. It will also be seen that the use of deflecting means of the form and arrangement which I have provided not only insures a more efficient distribution of the dust-laden air, but minimizes or takes advantage of the effects of natural winds which have heretofore interfered considerably with the dusting of crops.

While I have illustrated and described my improved dusting apparatus in a more or less detailed manner, it will be understood, of course, that I do not wish to be limited to the particular details and arrangements herein disclosed, nor to the use of the apparatus with any particular plants or crops, but regard my invention as including such changes and modifications as do not involve a departure from the spirit of the invention and the scope of the appended claims.

Having thus described my invention, I claim:

1. In apparatus for dusting ground crops, a traveling carriage, a blower thereon having a plurality of openings and operable to deliver streams of dust-laden air therethrough, a laterally elongated transversely curved substantially rigid deflector mounted on the carriage in spaced relation to the ground and with its concave face directed toward the ground, said deflector comprising an intermediate section and end sections hinged to said intermediate section so as to form lateral extensions thereof and adapted to be swung to an elevated position, flexible conduits extending between said blower openings and said sections and having discharge outlets for directing said streams against the concave face of said deflector, means for swinging said end sections to said elevated position, and means for raising or lowering said intermediate section for adjusting the spacing of the deflector relative to the ground.

2. In apparatus for dusting ground crops, a wheeled carriage movable over the ground, means on the carriage for causing a forced flow of dust-laden air including a row of laterally spaced outlets for discharging streams of such dust-laden air, a laterally elongated transversely curved deflector of substantially rigid construction mounted on said carriage in spaced relation to the ground and with its concave face directed toward the ground, the deflector being arranged to receive said streams of dust-laden air against its curved face and to deflect the dust-laden air downwardly, said deflector having a curvature substantially equal to ninety degrees of arc and being mounted on the carriage so that its upper and lower edges extend substantially parallel to the ground.

RALPH R. ROOT.